H. S. DICKINSON.
CLUTCH OPERATING MECHANISM.
APPLICATION FILED OCT. 14, 1911.
1,118,536.
Patented Nov. 24, 1914.
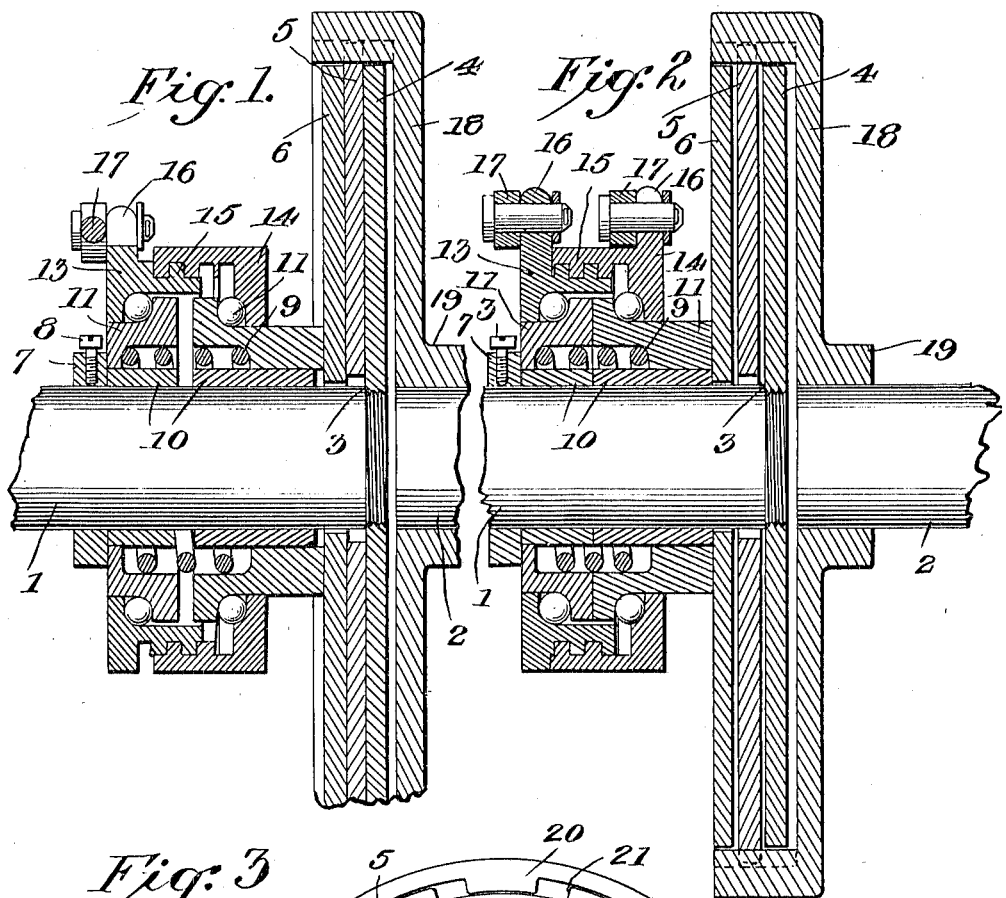
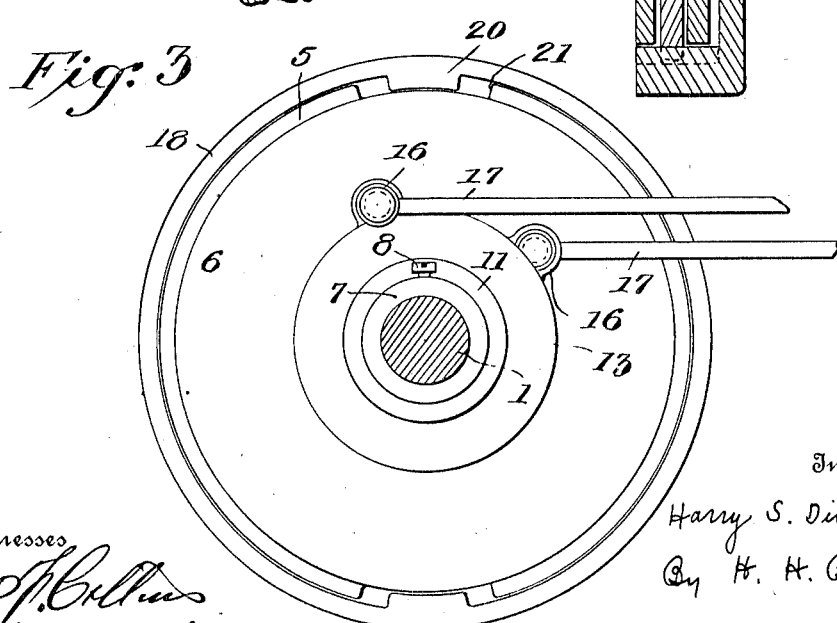
Inventor
Harry S. Dickinson
By H. H. Bliss
Attorney

UNITED STATES PATENT OFFICE.

HARRY S. DICKINSON, OF ROCK ISLAND, ILLINOIS.

CLUTCH-OPERATING MECHANISM.

1,118,536. Specification of Letters Patent. Patented Nov. 24, 1914.

Application filed October 14, 1911. Serial No. 654,715.

*To all whom it may concern:*

Be it known that I, HARRY S. DICKINSON, a citizen of the United States, residing at Rock Island, in the county of Rock Island and State of Illinois, have invented certain new and useful Improvements in Clutch-Operating Mechanism, of which the following is a specification, reference being had therein to the accompanying drawing.
This invention relates to improvements in clutch operating mechanisms and in particular to one adapted to eliminate end thrust.

The device is particularly for use in connection with clutches on gas engines where the shaft rotates at comparatively high speeds, as in automobiles and motor-cycles.

An object of the invention is to provide a spring-controlling or pinching device in which the part shall be entirely independent of connection with the frame, and, furthermore, shall be self-contained and dust proof. The mechanism is so constructed that when the clutch spring is compressed, thereby releasing the clutch members from contact with each other, all end thrust upon external parts is eliminated and is entirely confined to the mechanism itself.

In the drawings, Figure 1 is a longitudinal vertical sectional view through the clutch operating device showing it in connection with a clutch in the engaged position. Fig. 2 is a longitudinal vertical sectional view similar to Fig. 1 with the clutch withdrawn and the spring compressed. Fig. 3 is an end elevation of a clutch operating device.

Referring to the drawings, the numerals 1 and 2 indicate two shafts in line and adjacent to each other. The clutch illustrated is of the three disk type. Upon the end of the shaft 2 is secured the hub 19 of a cylindrical casing 18 which incloses the clutch disks and carries the intermediate disk 5. Two inward extending lugs 20 loosely fitting within notches 21 cut in the periphery of the central disk 5 act as keys to communicate rotation to or from the disk 5. A disk 4 is threaded upon the end of the shaft 1 and abuts against a shoulder 3 formed upon the shaft. This disk 4 is placed between the disk 5 and the wall of the casing 18. On the opposite side of the disk 5 is mounted a disk 6 which loosely surrounds the shaft 1. The peripheries of disks 4 and 6 are within the ends of the lugs 20 and are therefore free to rotate independent of the casing 18. When the three disks are pressed together rotation is communicated from one shaft to the other.

An adjustable abutment 7 is secured to the shaft 1 by means of a set screw 8. Interposed between the abutment and the clutch member 6 is a coil spring 9 encircling the shaft 1 and of the usual type such as is used for forcing one clutch surface into engagement with its opposite member. Interposed between the spring 9 and the shaft are two bearing sleeves 10 which serve to separate the spring from the shaft and furthermore carry the inward extending lips of the spring-engaging collars 11. These annular collars are of Z-shaped cross section, one leg of the Z extending inward against the wearing sleeves 10, thereby forming a chamber within which operates the spring 9. The outer portions of the spring-engaging collars are grooved out to form raceways for the two sets of ball bearings 12.

Two threaded collars 13 and 14 engage with each other and may be separated from each other or drawn together by means of the heavy threads 15 cut internally on the collar 14 and externally on the collar 13. These two collars form a dust proof casing which floats upon the ball bearings 12. The two collars are provided with upward extending lugs 16 in which operating arms or rods 17 are secured.

The operation of the device is as follows: Considering first the mechanism in the position shown in Fig. 2, it is evident that the spring is compressed between the inward extending lips of the spring-engaging collars 11. The collars are held together by means of the pinching mechanism composed of the two threaded collars 13 and 14 which are screwed together thereby squeezing the two collars 11 which, in turn, compress the spring. In this position considerable pressure is brought to bear upon the two sets of ball bearings 12 and, as a result, the shaft 1 will rotate within the bearing sleeves 10, the entire clutch operating device therefore being at rest. When, however, the operating rods 17 are moved in opposite directions so as to unscrew the two threaded collars upon each other thereby separating them, the pressure of the spring will force the two collars 11 apart thereby engaging one set of clutch members with its opposite members. In this position there will be very little pressure upon the ball bearings 12, and, as a consequence, the spring 9, bearing sleeves 10 and the spring-engaging collars will rotate with the shaft and clutch member. The pinching mechanism then floats upon the bearings with little or no friction.

When it is desirable to separate the clutch members, the two rods 17 are moved toward each other thereby bringing the two threaded collars of the pinching mechanism closely together which, in turn, presses the spring-engaging collars 11 upon the spring, compressing it within the collars 11 thereby removing all spring pressure from the clutch surfaces. In this position there is no end thrust whatever external to the clutch operating mechanism. All of the end thrust caused by the spring is self-contained within the device which is then stationary, the shaft rotating within the sleeves 10.

While I have shown a particular type of clutch merely in a diagrammatic way, it is evident that this device may be used with any type of clutch in which the surfaces are spring-engaged.

What I claim is:

1. In combination with a shaft, driving and driven clutch members, an abutment, a spring interposed between the abutment and one of the clutch members, spring-engaging collars, and a pinching mechanism engaging said collars and supported thereon, the said pinching mechanism and the said collars having contacting bearing surfaces which prevent movements of the pinching mechanism to positions eccentric of the collars.

2. In combination with a shaft, driving and driven clutch members, an abutment, a spring interposed between said abutment and one of the clutch members, a pinching mechanism for said spring comprising two collars threaded upon each other and loosely mounted upon the shaft.

3. In combination with a shaft, driving and driven clutch members mounted thereon, an abutment, a spring interposed between the abutment and one of the clutch members, bearing sleeves interposed between the spring and the shaft, spring-engaging collars surrounding said sleeves, and means for pinching said sleeves together.

4. In combination with a shaft, driving and driven clutch members, an abutment, a spring interposed between said abutment and one of the clutch members, bearing sleeves interposed between the spring and shaft, spring-engaging collars mounted upon the outer ends of the sleeves and inclosing the outer ends of the spring, and a pinching mechanism rotatably mounted upon said spring-engaging collars.

5. In combination with a shaft, driving and driven clutch members mounted thereon, an abutment, a spring interposed between said abutment and one of the clutch members, spring-engaging collars, and a pinching mechanism supported rotatably upon said collars, the said pinching mechanism and the said collars having contacting bearing surfaces which prevent movements of the pinching mechanism to positions eccentric of the collars.

6. In combination with a shaft, driving and driven clutch members, an abutment, a spring interposed between said abutment and one of the clutch members, rotatable spring-engaging collars surrounding said shaft and inclosing the ends of the spring, and a pinching mechanism rotatably mounted upon said collars.

7. In combination with a shaft, driving and driven clutch members mounted thereon, an abutment, a spring interposed between said abutment and one of the clutch members, spring-engaging collars mounted upon the shaft, and a pinching mechanism surrounding the collars and forming a dust proof casing.

8. The combination with opposite clutch members, of a spring normally forcing said members into engagement, and a pinching mechanism for said spring comprising two parts operatively connected to the opposite ends of the spring and screw threaded together whereby a rotation of one of the said parts relative to the other compresses or releases the spring.

9. The combination with a rotary shaft, of a concentric wheel, a friction disk carried on the interior of the wheel, a friction disk carried by the shaft and engaging the first mentioned disk, a spring for normally holding said disks in frictional engagement, and means independent of the rotation of the wheel and shaft for compressing the spring to release the clutch disks, and comprising two revoluble cam members.

10. The combination with a rotatable shaft, of a wheel mounted concentric the shaft, clutch members between the wheel and the shaft, a spring for normally holding the clutch members in engagement, and rotatable cam members engaging said spring and adapted on being rotated in one direction to compress the spring and on being rotated in the other direction to release the spring.

In testimony whereof I affix my signature, in presence of two witnesses.

HARRY S. DICKINSON.

Witnesses:
 B. D. CONNELLY,
 R. W. GOULD.